United States Patent
Nikitin et al.

(10) Patent No.: US 10,339,346 B2
(45) Date of Patent: Jul. 2, 2019

(54) SYSTEMS AND METHODS FOR A RECONFIGURABLE ANTENNA

(71) Applicant: INTERMEC, INC., Lynwood, WA (US)

(72) Inventors: Pavel Nikitin, Seattle, WA (US); Rene Martinez, Seattle, WA (US); Stephen J. Kelly, Seattle, WA (US)

(73) Assignee: INTERMEC, INC., Lynnwood, WA (US)

( * ) Notice: Subject to any disclaimer, the term of this patent is extended or adjusted under 35 U.S.C. 154(b) by 6 days.

(21) Appl. No.: 15/632,830

(22) Filed: Jun. 26, 2017

(65) Prior Publication Data

US 2018/0373909 A1    Dec. 27, 2018

(51) Int. Cl.
| | |
|---|---|
| *G06K 7/10* | (2006.01) |
| *H01Q 1/28* | (2006.01) |
| *H01Q 3/20* | (2006.01) |
| *H04B 7/06* | (2006.01) |
| *H04B 7/08* | (2006.01) |
| *H04B 7/10* | (2017.01) |
| *G01S 13/74* | (2006.01) |

(52) U.S. Cl.
CPC .......... *G06K 7/10346* (2013.01); *G01S 13/74* (2013.01); *G06K 7/10356* (2013.01); *H01Q 1/288* (2013.01); *H01Q 3/20* (2013.01); *H04B 7/0602* (2013.01); *H04B 7/0802* (2013.01); *H04B 7/10* (2013.01)

(58) Field of Classification Search
CPC ............ G06K 7/10346; G06K 7/10356; G01S 13/74; H01Q 1/288; H01Q 3/20; H04B 7/0602; H04B 7/0802; H04B 7/10
USPC ............................. 340/572.1–572.9; 235/375
See application file for complete search history.

(56) References Cited

U.S. PATENT DOCUMENTS

| | | | |
|---|---|---|---|
| 6,560,444 B1 | 5/2003 | Imberg | |
| 7,071,791 B1 | 7/2006 | Wilson, III | |
| 7,656,858 B2 | 2/2010 | Campero et al. | |
| 7,973,645 B1 | 7/2011 | Moretti et al. | |
| 8,010,116 B2 | 8/2011 | Scheinert | |
| 8,446,256 B2 | 5/2013 | Pinkham | |
| 8,497,762 B2 | 7/2013 | Campero et al. | |
| 8,593,283 B2 * | 11/2013 | Smith ..................... | H01Q 3/00 235/375 |

(Continued)

OTHER PUBLICATIONS

"Distributed Antenna System (DAS) keeping customers connected, wherever they are;" retrieved from http://www.att.com/gen/press-room?pid=23351 on Oct. 7, 2016.

(Continued)

*Primary Examiner* — Daryl C Pope
(74) *Attorney, Agent, or Firm* — Oliff PLC; R. Brian Drozd

(57) ABSTRACT

Systems and methods for a reconfigurable antenna are provided. One system includes a device having a plurality of antenna elements configured to read a radio-frequency identification (RFID) tag and a switch having an input configured to receive a control signal from an RFID reader via a communication line to select one antenna of the plurality of antenna elements. The device further include a controller configured to control a state of the switch, wherein the switch is configured to be switched between states when the controller receives the RFID control signal comprising an address unique to the switch, thereby allowing the RFID reader to send an interrogation signal to and receive a response from the RFID tag in response to receiving the RFID control signal.

20 Claims, 7 Drawing Sheets

(56) References Cited

U.S. PATENT DOCUMENTS

| | | | |
|---|---|---|---|
| 8,967,485 | B2 | 3/2015 | Piazza et al. |
| 9,137,078 | B2 | 9/2015 | Stapleton et al. |
| 9,215,556 | B2 | 12/2015 | Sheikman et al. |
| 9,287,609 | B2 | 3/2016 | Kolokotronis |
| 2007/0257857 | A1 | 11/2007 | Marino et al. |
| 2012/0095790 | A1 | 4/2012 | Stefik et al. |
| 2014/0260514 | A1 | 9/2014 | Williams et al. |
| 2015/0303569 | A1 | 10/2015 | Jacobs |
| 2016/0379026 | A1 | 12/2016 | Destraves et al. |

OTHER PUBLICATIONS

"Skyworks Solutions, Inc.: RF Swtich: SPDT RF Switches: AS193-73LF;" RF & Microwave Products from Skyowrks; retreived from https://store.skyworksinc.com/PortalProductDetail.aspx?ProdId=262145 on Oct. 7, 2016.

"EM4325; 4 kbit Read/Write, EPC Gen2 and TOTAL / ISO 18000-63 (Gen2) and ISO 18000-64 (TOTAL) Passive or Battery-Assisted Passive RFID IC;" EM MicroElectronic; retreived from http://www.emmicroelectronic.com/products/rf-identification-security/epc-and-uhf-ics/em4325 on Oct. 7, 2016.

Apr. 5, 2017 Office Action issued in U.S. Appl. No. 15/288,182.

"Hybrid Couplers;" Anaren Model 2D1304-3; retreived from the Internet http://www.richardsonrfpd.com/resources/RellDocuments/SYS_21/2D1304-3.pdf.

U.S. Appl. No. 15/288,182, filed Oct. 7, 2016 in the name of Martinez et al.

Aug. 16, 2017 Office Action issued in U.S. Appl. No. 15/288,182.

Mar. 14, 2018 Office Action issued in U.S. Appl. No. 15/288,182.

\* cited by examiner

SYSTEMS AND METHODS FOR A RECONFIGURABLE ANTENNA

BACKGROUND

Reconfigurable antennas have been used in many different applications, including radio frequency identification (RFID) scanning. In RFID scanning, handheld or mobile computers are widely used, such as in different field mobility environments. For example, these computing devices may be used by mobile field service and transportation workers to allow different types of mobile operations, such as in-field computing, radio frequency identifier (RFID) scanning, barcode scanning, and communication with remote external devices, among others.

Conventional reconfigurable antennas typically includes elements that can be electronically switched (e.g., shorted or opened) using different devices, such as PIN diodes or other switches controlled via external wiring. For example, reconfigurable RFID antennas require multiple variable DC bias units electrically connected to RF switches to change the antenna radiation properties in order to better read the RFID tags in different directions. As a result of these components, the antenna arrangements are costly and add complexity to the overall system (e.g., RFID reader) because of the need to generate and coordinate signals.

SUMMARY

To overcome these and other challenges, aspects of broad inventive principles are disclosed herein.

In one embodiment, a device is provided that includes a plurality of antenna elements configured to read a radio-frequency identification (RFID) tag and a switch having an input configured to receive a control signal from an RFID reader via a communication line to select one antenna of the plurality of antenna elements. The device further include a controller configured to control a state of the switch, wherein the switch is configured to be switched between states when the controller receives the RFID control signal comprising an address unique to the switch, thereby allowing the RFID reader to send an interrogation signal to and receive a response from the RFID tag in response to receiving the RFID control signal.

In another embodiment, a system is provided that includes an RFID reader and a reconfigurable antenna configured to couple to the RFID reader. The reconfigurable antenna has an antenna characteristic that is changed based on an RFID control signal received from the RFID reader, wherein the reconfigurable antenna is configured to appear as an RFID tag to the RFID reader.

In another embodiment, a method for controlling an antenna is provided. The method includes sending a control signal from an RFID reader to a reconfigurable antenna via a communication line, wherein the control signal includes an address of the reconfigurable antenna. The method further includes switching a state of the reconfigurable antenna to change an antenna characteristic of the reconfigurable antenna in response to determining that the address in the control signal matches an address stored in memory of the reconfigurable antenna. The method also includes sending an interrogation signal to an RFID tag via the antenna of the reconfigurable antenna and receiving a response from of the reconfigurable antenna after the switching is performed.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numerals represent like parts in the Figures.

Various embodiments include systems and methods for a reconfigurable antenna, such as a reconfigurable RFID antenna that can be connected to an RFID reader using a single communication line, such as a coaxial cable. RF signals and control signals from an RFID reader can then be communicated to the reconfigurable antenna using the coaxial cable to both control the configuration of the reconfigurable antenna and transmit RFID read signals. With the herein disclosed configurations, the reconfigurable RFID antenna is inexpensive and does not require complex controls.

In various embodiments, the reconfigurable antenna can be driven by a radio (e.g., RFID reader) using RFID signals to control the configuration of the reconfigurable antenna, which has one or more controllable antenna elements that appear to the RFID reader as RFID tags. For example, in various embodiments, the antenna elements in the reconfigurable antennas each have a unique addressable ID and can be controlled with RFID signals via a single coaxial cable.

It should be understood that while the reconfigurable antenna may be described in connection with handheld or portable computing devices for a particular application, the reconfigurable antenna may be used with different devices, and in many different applications. It should be noted that the reconfigurable antenna and various components are referred to herein for ease of illustration. However, it should be understood that the system and various components may be configured as a reconfigurable antenna for any type of RFID scanning system.

Figure 1:
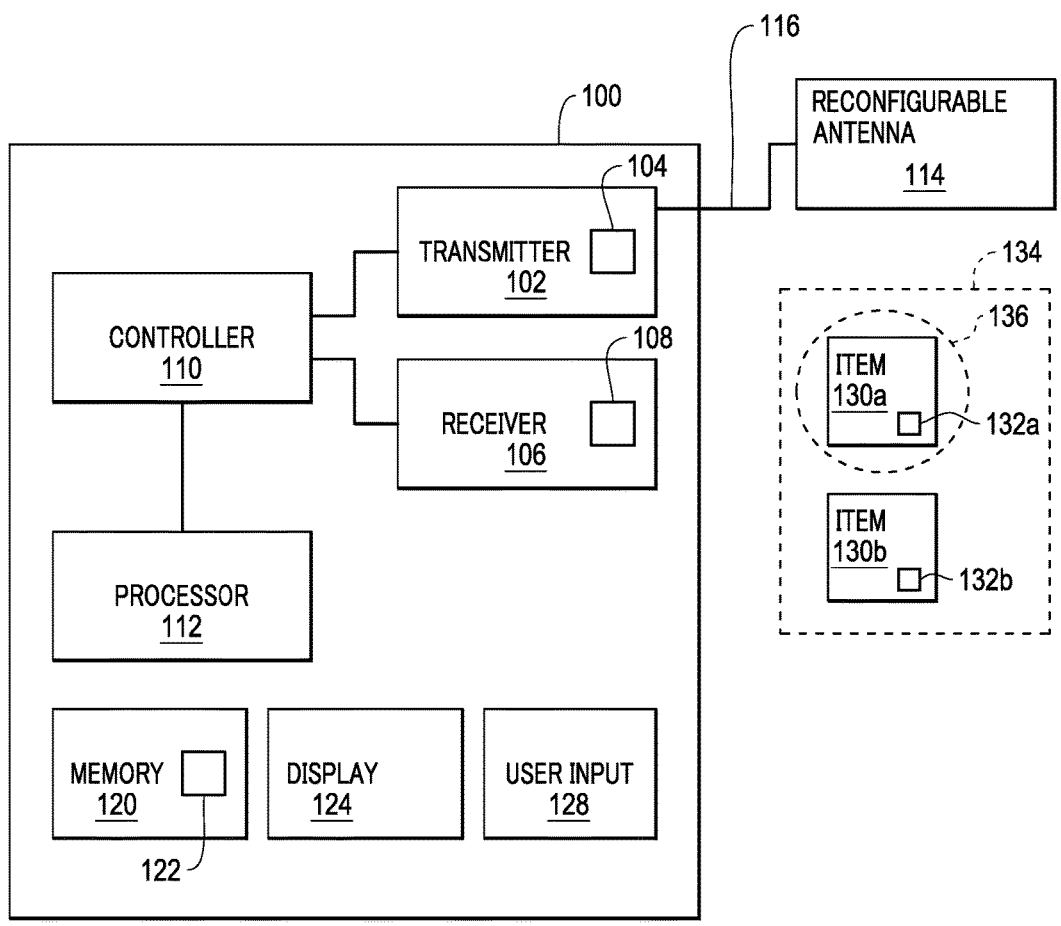
FIG. 1 is a block diagram illustrating an RFID system according to one embodiment.

An RFID system 100 with a reconfigurable antenna according to various embodiments may be implemented is shown in FIG. 1. The system 100 may be embodied as or form part of a handheld RFID scanner. For example, the system 100 may be embodied or form part of a mobile computing device, such as an Intermec mobile computer available from Honeywell Scanning and Mobility.

The RFID system 100 may comprise a transmitter 102 having one or more transmit antennas 104 and a receiver 106 having one or more receive antennas 108. The transmitter and receiver (and associated components) may be provided, for example, within a housing of the RFID system (e.g., within a housing of an RFID reader) or may be capable of removable coupling, such as in an antenna module configuration. Additionally, a reconfigurable antenna 114 may be provided that can be removably coupled to the RFID system 100 via single communication line 116, which in various embodiments is a single coaxial cable. In some embodiments, the reconfigurable antenna 114 may replace the one or more transmit antennas 104 and the one or more receive antennas 108.

It should be noted that the various antenna elements may take different configurations as would be used in antenna technology, such a particular to RFID antenna technology. For example, the antenna elements may be arranged or aligned to form different sized and shaped arrays as desired or needed, such as based on the RFID tags to be scanned.

The transmitter 102 and receiver 106 are selectively activated (e.g., selectively turned on and off) to scan a region of interest 134 to acquire RFID tag information, which may include changing the antenna characteristics of the RFID system 100 using the reconfigurable antenna 114. For example, the transmit configuration or antenna characteristics of the reconfigurable antenna 114 may be selectively changed using RFID control signals as described herein, which can change the resonant frequency, polarization and/or radiation pattern of the reconfigurable antenna 114.

In the illustrated embodiment of FIG. 1, the system 100 may also comprise a controller 110 coupled to the transmitter 102 and receiver 106 to generate both RFID read signals and control signals for changing the configuration of the reconfigurable antenna 114. It should be noted that any type of communicative or operative coupling may be used, such as any type of wireless or wired communication. The controller 110 is configured to control the operation of the transmitter 102 and receiver 106, such as to control the transmissions by the transmit antenna 104 and the reception by the receive antennas 108, as well as the antenna configuration of the reconfigurable antenna 114. In one embodiment, the controller 110 is a transmit and receive controller configured to control the radio-frequency (RF) pulses sent to the transmit antenna 102 and the communication of signals received by the receive antennas 108, as well as control signals sent to the reconfigurable antenna 114 to change the configuration of the reconfigurable antenna 114.

The system 100 may further comprise a processor 112 coupled to the controller 110. As described in more detail herein, the processor 112 can control the operation of the controller 110 to transmit and receive as desired or needed, including to change antenna characteristics by dynamically reconfiguring the reconfigurable antenna 114. The processor 112 is also configured in various embodiments to process received signal information to determine the location and/or acquire information for one or more RFID tags 132a, 132b coupled to items 130a, 130b as described herein. For example, the region of interest 134 may be a portion of a storage facility having a large number of RFID tagged objects or items and the RFID tag 132 may be affixed directly to the item 130 or a packaging of the item using techniques in the art.

The processor 114 is configured to receive tag response and/or read information using an antenna arrangement that is reconfigurable using the reconfigurable antenna 114. A memory 120, which may be any type of electronic storage device, can be coupled to the processor 112 (or form part of the processor 112). The processor 112 may access the memory 112 to obtain stored information 122 such as control identification (ID) information for use in selectively changing the configuration of the reconfigurable antenna 114 as described in more detail herein.

The system 100 may also comprise a display 124 and user input device 128 coupled to the processor 112 to allow user interaction with the system 100. For example, the display 124 can allow selecting a particular antenna configuration for the reconfigurable antenna 114 based on the type of RFID scan to be performed. It should be noted that in some embodiments, the display 124 and user input device 128 may be integrated, such as in a touchscreen display device.

While FIG. 1 illustrates a particular connection arrangement of the various components, a skilled artisan would appreciate the fact that other connection arrangements may be made that are within the scope of this disclosure. Additionally, the various components may be housed within the same or different physical units and the separation of components within FIG. 1 is merely for illustration. The system 100 may also comprise one or more communication subsystems to allow communication with external devices, such as networks, printers, etc. Thus, additional components may form part of or communicate with the system 100.

Figures 2A, 2B:
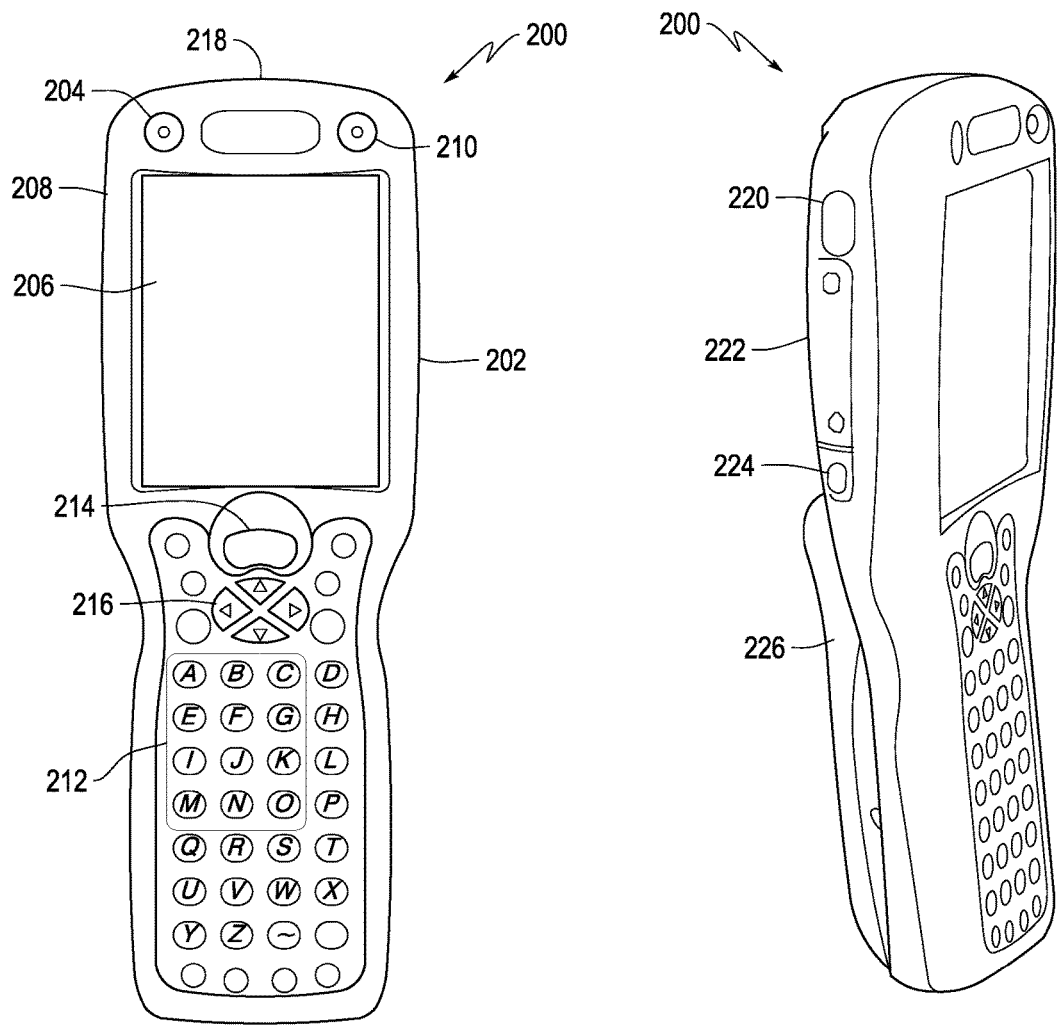
FIGS. 2A, 2B and 2C schematically illustrate an RFID apparatus according to one embodiment.

In some embodiments, the system 100 may be embodied as part of a RFID apparatus 200 is shown in FIGS. 2A (front panel view), 2B (oblique panel view) and 2C (bottom panel view). The RFID apparatus 200 (e.g., RFID reader) can comprise a housing 202 within which other components of RFID apparatus 200 can be disposed. An LCD screen display with touch screen sensor 206 can be disposed on a front panel 208. Also disposed on the front panel 208 can be an operation LED 204, a scan LED 210, and keyboard 212 including a scan key 214 and navigation keys 216. An imaging window 218 can be disposed on the top panel of the housing 202. Disposed on the side panel (best viewed in FIG. 2B) can be an infrared communication port 220, an access door to a secure digital (SD) memory interface 222, an audio jack 224, and a hand strap 226. Disposed on the bottom panel (best viewed in FIG. 1C) can be a multi-pin mechanical connector 228 and a hand strap clip 230.

Also disposed on the bottom panel (or alternatively on the top panel) can be an RFID antenna housing and an RFID read device (which may can include the transmitter 102 and receiver 106 shown in FIG. 1) within the housing 202. In the illustrated embodiment, a connection port 232 is configured to connect with the reconfigurable antenna 114 (shown in FIG. 1). For example, the connection port 232 may be a coaxial interface for connection with a single coaxial cable that is part of the reconfigurable antenna 114. It should be noted that the reconfigurable antenna 114 may be removably coupled to the housing 202 using any suitable fastening arrangement (e.g., a snap fit connection).

While FIGS. 1A-1C illustrate one embodiment of a handheld housing, a skilled artisan would appreciate that other types and form factors of terminal housings are within the scope of this disclosure.

Figure 3:
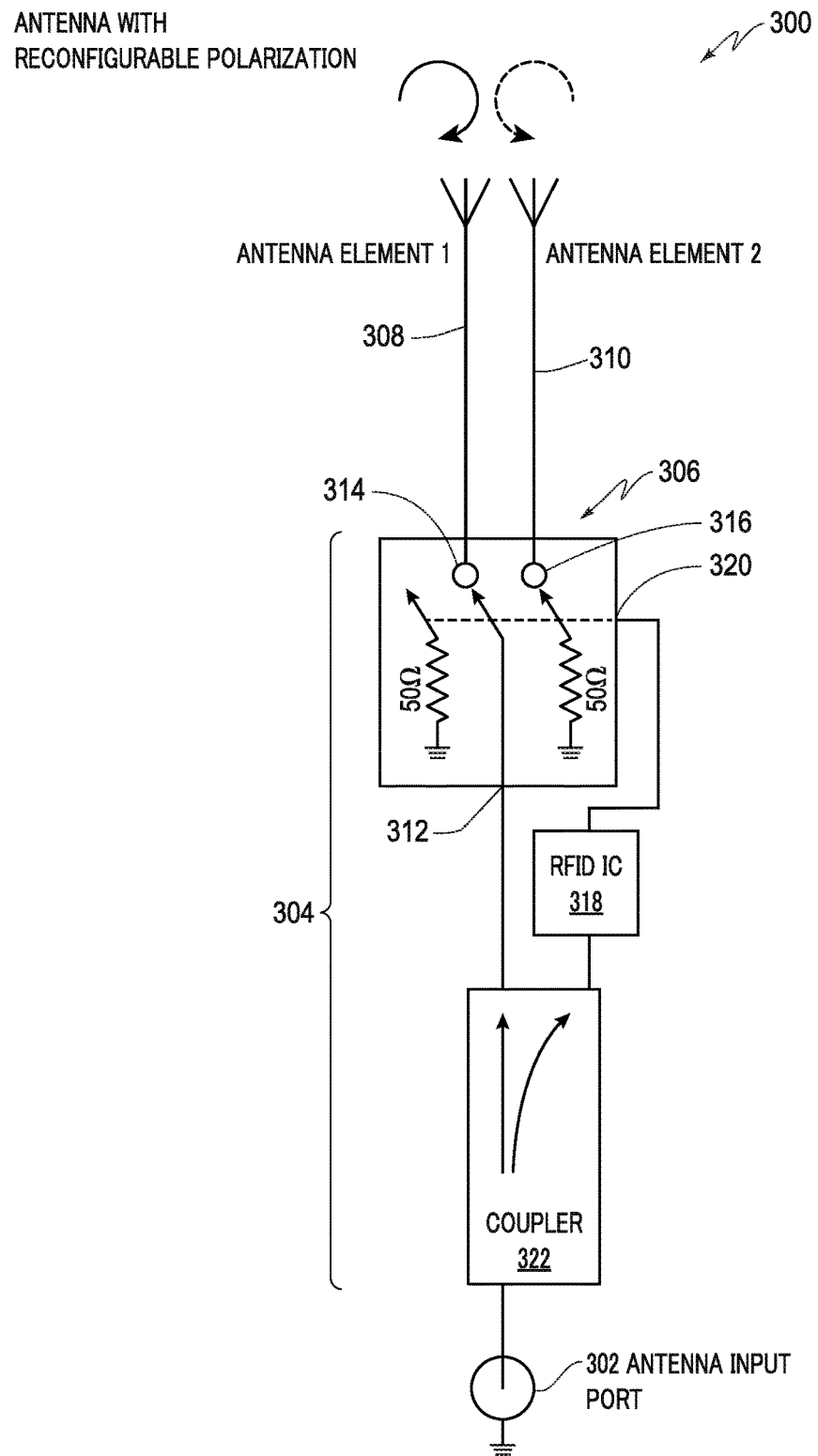
FIG. 3 is a block diagram of a reconfigurable switch according to one embodiment.
Figure 4:
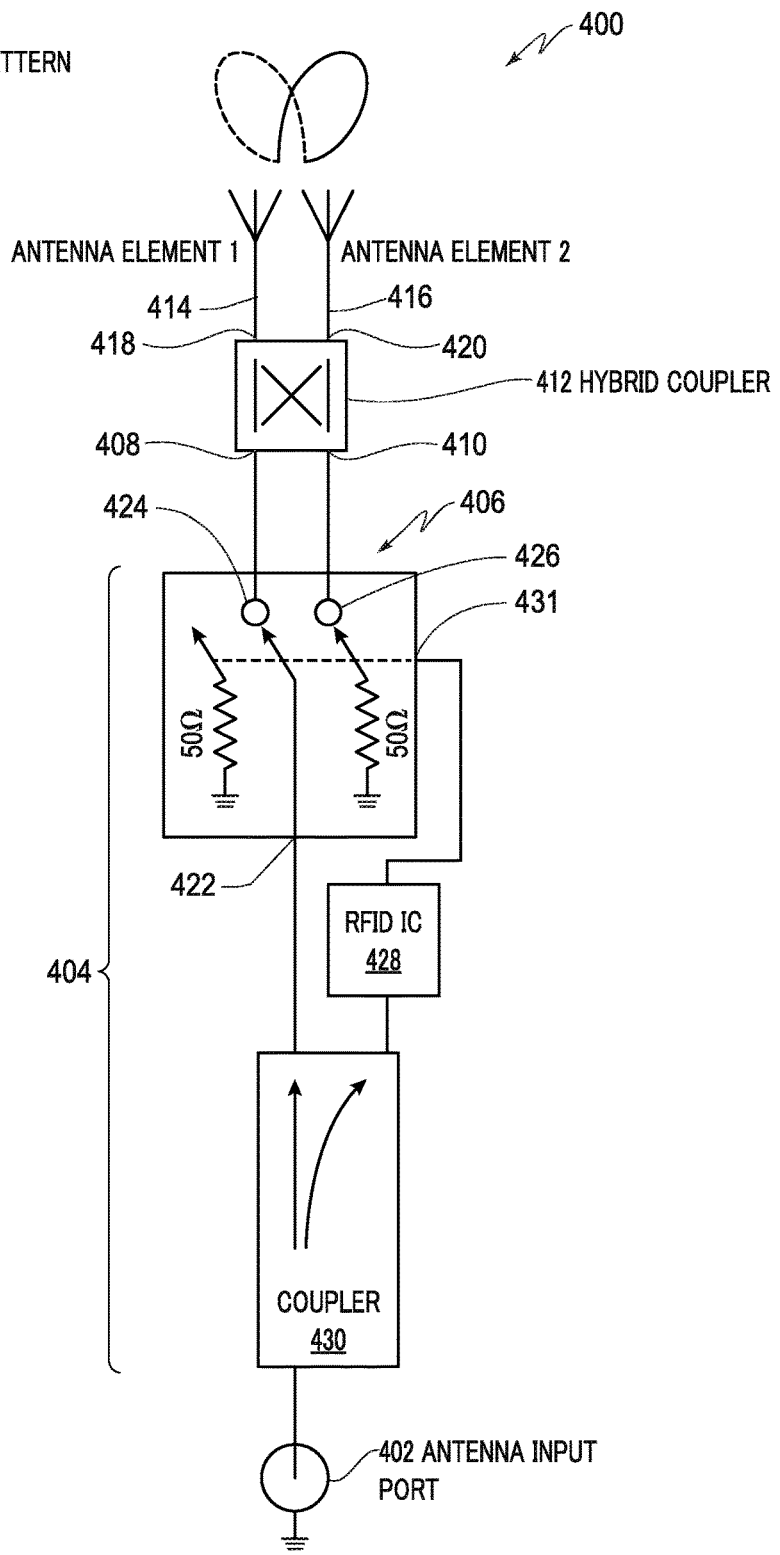
FIG. 4 is a block diagram of a reconfigurable switch according to another embodiment.

FIG. 3 illustrates a reconfigurable antenna 300 having a reconfigurable polarization and FIG. 4 illustrates a reconfigurable antenna 400 having a reconfigurable radiation pattern. Like numerals represent like parts in the various figures. It should be appreciated that other configurations are contemplated by the present disclosure, such as to control other antenna characteristics, for example, resonant frequency or a frequency band.

Figure 2C:
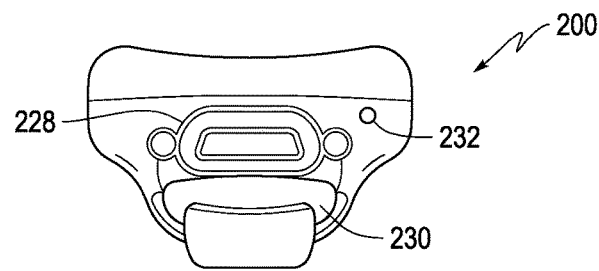

The reconfigurable antenna 300 and reconfigurable antenna 400 may be embodied as an antenna module that may be connected to the RFID system 100 (shown in FIG. 1), such as connected to an RFID apparatus 200 using a coaxial cable. As shown in FIGS. 3 and 4, an antenna input port 302 or 402 may be provided for connection to the reconfigurable antenna 300 or reconfigurable antenna 400. For example, the input port 302 or 402 allows for connection to the RFID system 100, such as to connection port 232 (shown in FIG. 2C) via a coaxial cable.

With particular reference to FIG. 3, the reconfigurable antenna 300 includes a control portion 304, which in some embodiments is embodied as a printed circuit board (PCB), that allows for selective control and reconfiguration of the antenna characteristics of the reconfigurable antenna 300. As described in more detail herein, the control portion 304 includes controllable elements (including switching elements) that appear to the RFID system 100 as RFID tags that can be selectively controlled using RFID control signals. In particular, the reconfigurable antenna 300 includes a switching arrangement having a switch 306 that includes one or more switchable elements that are controllable using RFID control signals from an RFID reader. The switch 306 may be any type of switching device, including mechanical or electrical switches (e.g., a single pole, double throw switch or a semiconductor device). In one embodiment, the switch 306 is an RF switch coupled to a first antenna element 308 and a second antenna element 310. In the illustrated embodiment, the switch 306 is configured to operate or behave similar to or as an RFID tag. Thus, for example, an RFID type of transmitter/receiver may be used to selectively activate the first or second antenna element 308, 310 using the switch 306.

In the embodiment of FIG. 3, the switch 306 is an antenna switch and in the illustrated embodiment is a three-port device with an IN port 312, an OUT1 port 314 (first output port connected to the first antenna element 308) and OUT2 port 316 (second output port connected to the second antenna element 310) as three ports. The switch 306 is configured to be switchable into two switching states. State A connects the input (IN port 312) via the OUT1 port 314 to the antenna element 308 to define a first antenna polarization. The switch 306 is also configured to provide a state B that connects the input (IN port 312) to the OUT2 port 310 to the antenna element 310 to define a second antenna polarization.

Thus, the reconfigurable antenna 300 is selectively controllable to reconfigure the antenna polarization. For example, with the reconfigurable antenna 300 as shown in FIG. 3, the RFID apparatus 200 (RFID reader) can selectively switch between two different antenna polarizations defined by the first and second antenna elements 308 and 310. The RFID reader 200 is then able to communicate with an RFID tag (e.g., the RFID tag 132a or 132b shown in FIG. 1) using RFID signals and obtain RFID data from the RFID tag. The reconfigurable antenna 300 may include additional antenna elements that may be used to operate the RFID apparatus 202 at additional different polarizations.

Thus, in operation, the switch 306 is a three-port device (e.g., a "T-junction") with three ports: IN 312, OUT1 314, and OUT2 316 and operable in two states: State A where the IN port 312 is connected to the OUT1 port 314 (first polarization state), and State B where the IN port 312 is connected to the OUT2 port 316 (second polarization state). As illustrated in FIG. 3, the reconfigurable antenna 300 includes a controller or control module, which in the illustrated embodiment is an integrated circuit (IC), more particularly an RFID IC 318 that has a unique addressable ID (e.g., Gen2 EPC ID).

The switch 306 is controllable to switch between the output 314 and the output 316 by uniquely addressing the RFID IC 318 to thereby control the state of the switch 306 by sending a control signal to a control input 320 of the switch 306. For example, in one embodiment, the RFID IC 318 is an EM4325 Gen2 IC (available from EM Microelectronic) with a Serial Peripheral Interface (SPI) that outputs signals to switch the switch 306 (e.g., the RF switch may be controlled by signals from RFID IC GPIO (general-purpose input/output) pins of the EM4325 Gen2 IC). In one embodiment, the switch 306 is a pseudomorphic high-electron-mobility transistor (pHEMT) gallium arsenide (GaAs) switch, such as an AS193-73LF RF switch (available from Skyworks). In operation, RFID control signals may be transmitted to the reconfigurable antenna 300 and received by the RFID IC 318, such that the RFID IC 318 operates as an RF front end and protocol handler for communication with one or more RFID tags as described in more detail herein. Thus, this configuration allows for the switch 306 to be switched between states, such that the antenna elements 308, 310 coupled with the switch 306 may be selectively activated, thereby allowing RFID signal transmission via the antenna element 308 or 310 (e.g., communication with one or RFID tags using RFID communication protocols). The various components of the reconfigurable switch 300 may be coupled via one or more different connection arrangements, including wirelessly or wired. Thus, for example, the switch 306 and RFID IC 318 may be coupled to each other using a wired communication line or a wireless communication link In one or more embodiments, including the above-discussed configurations, the reconfigurable switch 300 appears as an RFID tag to a controller, and as such, can be controlled using RFID signal protocols. For example, the reconfigurable switch 300 has a unique ID corresponding to the RFID IC 318 (which may be communicated in a header portion of a transmit signal to communicate with the reconfigurable switch 300). Thus, in operation, communication with the reconfigurable switch 300 may be performed in a manner that would be used to communicate with an RFID tag. For example, in some embodiments, a Gen2 RFID communication protocol may be used to communicate with the RFID IC 318 to control switching of the reconfigurable switch 300. The communication in various embodiments includes, for example, an RFID communication setup sequence (including a handshake) to communicate with the switch 306. By sending an RFID signal addressed to the specific RFID IC 318 of the reconfigurable switch 300, the switch 306 associated with that RFID IC 318 may be controlled, such as between different antenna connection states as described herein. The determination of the ID associated with the RFID IC 318 (and RFID ICs in other reconfigurable switches), and thus, with the reconfigurable switch 300, may be stored in a lookup table or other memory (e.g., the memory 120 shown in FIG. 1) to allow for lookup of the IDs for the RFID IC 318.

Additionally, the reconfigurable switch 300 includes a coupler 322 (e.g., a resistive ladder with impedance matching, resistive divider or microwave coupler) that couples the input port 302 to the RFID IC 318 and to the output ports 314 and 316 through the switch 306. The coupler 322 may be any coupling member that splits a portion of the incoming RFID signal and communicates the signal to the RFID IC 318. For example, the coupler 322 may take a small portion of the signal (e.g., 20 dB lower in power) and communicate that portion to the RFID IC 318 to control the RFID IC 318, which allows for control of the switch 306 at a lower insertion loss. Thus, the RFID signal received by the reconfigurable switch 300 flows through the coupler 322 to the switch 306, with a portion of the RFID signal split off from the main RFID signal and sent to the RFID IC 318. The main portion of the RFID signal that passes through the coupler 322 and to the switch 306 is then communicated to the antenna element 308 or antenna element 310 depending on the state of the switch 306.

It should be appreciated that the configuration of the switch 306 illustrated in FIG. 3 allows for bi-directional communication through the switch 306, for example, to and from the RFID tag 132*a*, 132*b* (shown in FIG. 1) by selectively activating the antenna element 308 or antenna element 310 coupled with the switch 306. It should be noted that in various embodiments, the switch 306 and the RFID IC 318 are powered from a DC voltage biased on the coaxial cable independent of the RF signal. However, in other embodiments, the DC voltage is injected into the RF signal that is communicated to the reconfigurable switch 300 (e.g., DC signal injected to RF signal from an RFID reader).

In operation, the reconfigurable switch 300 appears to the system as an RFID tag (with memory fields) and can be controlled using RFID control signals. For example, a unique bit value may be written to a memory field of the RFID IC 318 (by sending a an RFID signal uniquely addressed to the RFID IC 318 using RFID transmission protocols) to control the reconfigurable switch 300 by communicating to the RFID IC 318 a control signal to switch the switch 306. For example, the RFID IC 318 receives an RFID signal that causes the RFID IC 318 to control the reconfigurable switch 300 (by controlling the switch 306) to change states from the current state to the other state (e.g., from State A to State B or State B to State A). Thus, RFID communication (e.g., RFID signals/data, general purpose command signals, etc.) may be provided between the RFID reader 200 and one or more RFID tags using different polarizations. As such, the reconfigurable switch 300 is capable of being used in combination with different RFID readers in different applications by selectively addressing the RFID IC 318 in the reconfigurable switch 300 to activate a particular antenna element 308 or 310 coupled with the switch 306 based on the unique ID of the RFID IC 318 for the reconfigurable switch 300. The reconfigurable switch 300 allows communication with one or more RFID tags, such as the RFID tag 132*a*, 132*b* within an RFID reading range of the antenna element 308 or 310 using RFID communication protocols. Using RFID control signals, the RFID reader 200 is able to communicate with one or more RFID tags using different polarizations by selectively activating the antenna element 308 or 310 and without requiring modification to the RFID reader 200 to allow the reconfiguration of the antenna. Thus, in an RFID scanning operation, before reading RFID tags, the reader sends a control signal to the reconfigurable switch 300 to set the state of the switch 306. The reconfigurable switch 300 has two states, thus defining an antenna arrangement with two states, which in the reconfigurable switch 300 defines two different antenna polarizations. It should be noted that additional switches and antenna elements may be added to provide additional states.

With respect to identifying the RFID tag that is responding and communicating with the system, various different methods may be used, but are not limited to the ones discussed herein. For example, in some embodiments the antenna may be a directional antenna that is able to determine the direction from which signal are received (e.g., is the signal coming from an RFID tag to the left, to the right, or in front of the antenna). In other embodiments, the signal strength may be used to determine the location of the responding RFID tag (e.g., the weaker the signal strength the further away the RFID tag is located and, thus, located in a parking spot not in front of the antenna). In still other embodiments, a received signal strength indicator (RSSI) may be used to determine the location of the responding RFID tags. In yet other embodiments, the phase of the RFID response may be used to determine the location of the RFID tags that are responding.

With reference to FIG. 4, the reconfigurable antenna 400 includes a control portion 404, which in some embodiments is embodied as a printed circuit board (PCB), that allows for selective control and reconfiguration of the antenna characteristics of the reconfigurable antenna 400. As described in more detail herein, the control portion 404 includes controllable elements (including switching elements) that appear to the RFID system 100 as RFID tags that can be selectively controlled using RFID control signals. In particular, the reconfigurable antenna 400 includes a switching arrangement having a switch 406 that includes a switchable element that is controllable using RFID control signals from an RFID reader. The switch 406 may be any type of switching device, including mechanical or electrical switches (e.g., a single pole, double throw switch or a semiconductor device).

In one embodiment, the switch 406 is an RF switch coupled to a first input 408 and a second input 410 of a hybrid coupler 412. In the illustrated embodiment, the switch 406 is configured to operate or behave similar to or as an RFID tag. First and second antenna elements 414 and 416 are connected to outputs 418 and 420 of the hybrid coupler 412. Thus, for example, an RFID type of transmitter/receiver may be used to selectively activate the first or second antenna element 414, 416 via the hybrid coupler 412 using the switch 406 to provide a reconfigurable antenna pattern.

In the embodiment of FIG. 4, the switch 406 is an antenna switch and in the illustrated embodiment is a three-port device with an IN port 422, an OUT1 port 424 (first output port connected to the first input 408 of the hybrid coupler 412) and OUT2 port 426 (second output port connected to the second input 410 of the hybrid coupler 412) as three ports. The switch 406 is configured to be switchable into two switching states. State A connects the input (IN port 422) via the OUT1 port 424 to the first input 408 of the hybrid coupler 412 to define a first antenna radiation pattern. The switch 406 is also configured to provide a state B that connects the input (IN port 422) to the second input 410 of the hybrid coupler 412 to define a second antenna radiation pattern. It should be noted that the different radiation patterns may be generated using the hybrid coupler 418 that controls beam steering. For example, in one embodiment, the hybrid coupler 418 is a 90 degree hybrid coupler 418 configured to provide a two-beam reconfigurable antenna using the first and second antenna elements 414 and 416 as radiating elements. In one embodiment, state A defines a left steer direction and state B defines a right steer direction.

Thus, the reconfigurable antenna 400 is selectively controllable to reconfigure the antenna radiation pattern. For example, with the reconfigurable antenna 400 as shown in FIG. 4, the RFID apparatus 200 (RFID reader) can selectively switch between two different antenna radiation patterns generated by the hybrid coupler 412 and two radiating elements defined by the first and second antenna elements 414 and 416. The RFID reader 200 is then able to communicate with an RFID tag (e.g., the RFID tag 132a or 132b shown in FIG. 1) using RFID signals and obtain RFID data from the RFID tag. The reconfigurable antenna 400 may include additional antenna elements that may be used to operate the RFID apparatus 200 at additional different radiation patterns (beam steering directions).

Thus, in operation, the switch 406 is a three-port device (e.g., a "T-junction") with three ports: IN 422, OUT1 424, and OUT2 424 and operable in two states: State A where the IN port 422 is connected to the OUT1 port 424 (first radiation pattern state), and State B where the IN port 422 is connected to the OUT2 port 42 (second radiation pattern state). As illustrated in FIG. 4, the reconfigurable antenna 400 includes a controller or control module, which in the illustrated embodiment is an integrated circuit (IC), more particularly an RFID IC 428 that has a unique addressable ID (e.g., Gen2 EPC ID).

The switch 406 is controllable to switch between the output 424 and the output 426 of the switch 406 by uniquely addressing the RFID IC 428 to thereby control the state of the switch 406 by sending a control signal to a control input 431 of the switch 406. For example, in one embodiment, the RFID IC 428 is an EM4325 Gen2 IC (available from EM Microelectronic) with a Serial Peripheral Interface (SPI) that outputs signals to switch the switch 406 (e.g., the RF switch may be controlled by signals from RFID IC GPIO (general-purpose input/output) pins of the EM4325 Gen2 IC). In one embodiment, the switch 406 is a pseudomorphic high-electron-mobility transistor (pHEMT) gallium arsenide (GaAs) switch, such as an AS193-73LF RF switch (available from Skyworks). In operation, RFID control signals may be transmitted to the reconfigurable antenna 400 and received by the RFID IC 428, such that the RFID IC 428 operates as an RF front end and protocol handler for communication with one or more RFID tags as described in more detail herein. Thus, this configuration allows for the switch 406 to be switched between states, such that the antenna elements 414, 416 coupled with the switch 406 may be selectively activated and controller, thereby allowing RFID signal transmission via the antenna element 414, 416 to define different radiation patterns (e.g., communication with one or RFID tags using RFID communication protocols). The various components of the reconfigurable switch 400 may be coupled via one or more different connection arrangements, including wirelessly or wired. Thus, for example, the switch 406 and RFID IC 428 may be coupled to each other using a wired communication line or a wireless communication link In one or more embodiments, including the above-discussed configurations, the reconfigurable switch 400 appears as an RFID tag to a controller, and as such, can be controlled using RFID signal protocols. For example, the reconfigurable switch 400 has a unique ID corresponding to the RFID IC 428 (which may be communicated in a header portion of a transmit signal to communicate with the reconfigurable switch 400). Thus, in operation, communication with the reconfigurable switch 400 may be performed in a manner that would be used to communicate with an RFID tag. For example, in some embodiments, a Gen2 RFID communication protocol may be used to communicate with the RFID IC 428 to control switching of the reconfigurable switch 400. The communication in various embodiments includes, for example, an RFID communication setup sequence (including a handshake) to communicate with the switch 406. By sending an RFID signal addressed to the specific RFID IC 428 of the reconfigurable switch 400, the switch 406 associated with that RFID IC 418 may be controlled, such as between different antenna radiation patterns as described herein. The determination of the ID associated with the RFID IC 428 (and RFID ICs in other reconfigurable switches), and thus, with the reconfigurable switch 400, may be stored in a lookup table or other memory (e.g., the memory 120 shown in FIG. 1) to allow for lookup of the ID for the RFID IC 428.

Additionally, the reconfigurable switch 400 includes a coupler 430 (e.g., a resistive ladder with impedance matching, resistive divider or microwave coupler) that couples the input port 402 to the RFID IC 428 and to the output ports 424 and 426 through the switch 406. The coupler 430 may be any coupling member that splits a portion of the incoming RFID signal and communicates the signal to the RFID IC 428. For example, the coupler 430 may take a small portion of the signal (e.g., 20 dB lower in power) and communicate that portion to the RFID IC 428 to control the RFID IC 428, which allows for control of the switch 406 at a lower insertion loss. Thus, the RFID signal received by the reconfigurable switch 400 flows through the coupler 430 to the switch 406, with a portion of the RFID signal split off from the main RFID signal and sent to the RFID IC 428. The main portion of the RFID signal that passes through the coupler 420 and to the switch 406 is then communicated to the antenna element 414 or antenna element 416 via the hybrid coupler 412 depending on the state of the switch 406.

It should be appreciated that the configuration of the switch 406 illustrated in FIG. 4 allows for bi-directional communication through the switch 406, for example, to and from the RFID tag 132a, 132b (shown in FIG. 1) by selectively activating the antenna element 414 or antenna element 416 coupled with the switch 406 via the hybrid coupler 430. It should be noted that in various embodiments, the switch 406 and the RFID IC 428 are powered from a DC voltage biased on the coaxial cable independent of the RF signal. However, in other embodiments, the DC voltage is injected into the RF signal that is communicated to the reconfigurable switch 400 (e.g., DC signal injected to RF signal from an RFID reader).

In operation, the reconfigurable switch 400 appears to the system as an RFID tag (with memory fields) and can be controlled using RFID control signals. For example, a unique bit value may be written to a memory field of the RFID IC 428 (by sending a an RFID signal uniquely addressed to the RFID IC 428 using RFID transmission protocols) to control the reconfigurable switch 400 by communicating to the RFID IC 428 a control signal to switch the switch 406. For example, the RFID IC 428 receives an RFID signal that causes the RFID IC 428 to control the reconfigurable switch 400 (by controlling the switch 406) to change states from the current state to the other state (e.g., from State A to State B or State B to State A). Thus, RFID communication (e.g., RFID signals/data, general purpose command signals, etc.) may be provided between the RFID reader 200 and one or more RFID tags using different antenna radiation patterns. As such, the reconfigurable switch 400 is capable of being used in combination with different RFID readers in different applications by selectively addressing the RFID IC 428 in the reconfigurable switch 400 to activate a particular antenna element 414 or 416 coupled with the switch 406 via the hybrid coupler 412 based on the unique ID of the RFID IC 428 for the reconfigurable switch 400. The reconfigurable switch 400 allows communication with one or more RFID tags, such as the RFID tag 132a, 132b within an RFID reading range of the antenna element 414 or 416 using RFID communication protocols. Using RFID control signals, the RFID reader 200 is able to communicate with one or more RFID tags using different polarizations by selectively activating the antenna element 414 or 416 and without requiring modification to the RFID reader 200 to allow the reconfiguration of the antenna. Thus, in an RFID scanning operation, before reading RFID tags, the reader sends a control signal to the reconfigurable switch 400 to set the state of the switch 406. The reconfigurable switch 400 has two states, thus defining an antenna arrangement with two states, which in the reconfigurable switch 400 defines two different antenna radiation patterns. It should be noted that additional switches and antenna elements may be added to provide additional states.

Figure 5:
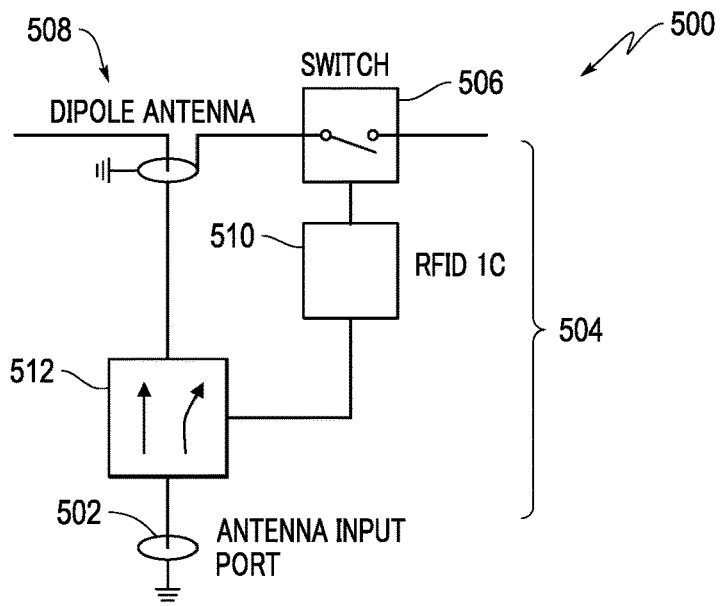
FIG. 5 is a block diagram of a reconfigurable switch according to another embodiment.

In another embodiment, as illustrated in FIG. 5, a reconfigurable antenna 500 includes a control portion 404, which in some embodiments is embodied as a printed circuit board (PCB), that allows for selective control and reconfiguration of the antenna characteristics of the reconfigurable antenna 500. The control portion 504 includes controllable elements (including switching elements) that appear to the RFID system 100 as RFID tags that can be selectively controlled using RFID control signals. In particular, the reconfigurable antenna 500 includes a switching arrangement having a switch 506 that includes a switchable element that is controllable using RFID control signals from an RFID reader. The switch 506 may be any type of switching device, including mechanical or electrical switches (e.g., a single pole, double throw switch or a semiconductor device).

As shown in FIG. 5, an antenna input port 502 may be provided for connection to the reconfigurable antenna 500. For example, the input port 502 allows for connection to the RFID system 100, such as to connection port 232 (shown in FIG. 2C) via a coaxial cable. In operation, by selectively controlling the switch 506, an antenna arrangement having a reconfigurable frequency band is provided.

In one embodiment, the switch 506 is an RF switch that allows switching to select an antenna element 508. The switch 506 is configured to operate or behave similar to or as an RFID tag. Thus, for example, an RFID type of transmitter/receiver may be used to selectively activate the antenna element 508 to provide a reconfigurable antenna frequency band.

In the embodiment of FIG. 5, the switch 506 is an antenna switch configured to be switchable into two switching states. State A (illustrated in FIG. 4) connects the antenna element 508 to an overall antenna structure and State B is configured as a pass-through state, wherein the antenna element 508 does not form part of the overall antenna structure. By switching in and out the antenna element 508, a reconfigurable frequency band for an overall antenna arrangement may be provided. Thus, the reconfigurable antenna 500 is selectively controllable to reconfigure the antenna frequency band.

For example, with the reconfigurable antenna 500 as shown in FIG. 5, the RFID apparatus 200 (RFID reader) can selectively select the antenna element 508 to define a particular desired or required frequency band based on the operating characteristics of the antenna element 508 (which may be connected to other antenna elements). The RFID reader 200 is then able to communicate with an RFID tag (e.g., the RFID tag 132a or 132b shown in FIG. 1) using RFID signals and obtain RFID data from the RFID tag. The reconfigurable antenna 500 may include additional antenna elements that may be used to operate the RFID apparatus 200 at additional different frequency bands.

Thus, in operation, the switch 506 is operable in two states to effectively select or deselect the antenna element 508. As illustrated in FIG. 5, the reconfigurable antenna 500 includes a controller or control module, which in the illustrated embodiment is an integrated circuit (IC), more particularly an RFID IC 510 that has a unique addressable ID (e.g., Gen2 EPC ID). The switch 506 is controllable by uniquely addressing the RFID IC 510 to thereby control the state of the switch 506 by sending a control signal to the switch 506. For example, in one embodiment, the RFID IC 510 is an EM4325 Gen2 IC (available from EM Microelectronic) with a Serial Peripheral Interface (SPI) that outputs signals to switch the switch 506 (e.g., the RF switch may be controlled by signals from RFID IC GPIO (general-purpose input/output) pins of the EM4325 Gen2 IC). In one embodiment, the switch 506 is a pseudomorphic high-electron-mobility transistor (pHEMT) gallium arsenide (GaAs) switch, such as an AS193-73LF RF switch (available from Skyworks). In operation, RFID control signals may be transmitted to the reconfigurable antenna 500 and received by the RFID IC 510, such that the RFID IC 510 operates as an RF front end and protocol handler for communication with one or more RFID tags as described in more detail herein. Thus, this configuration allows for the switch 506 to be switched between states, such that the antenna element 506 coupled with the switch 506 may be selectively activated and controller, thereby allowing RFID signal transmission via the antenna element 508 to define different frequency bands (e.g., communication with one or RFID tags using RFID communication protocols). The various components of the reconfigurable switch 500 may be coupled via one or more different connection arrangements, including wirelessly or wired. Thus, for example, the switch 506 and RFID IC 510 may be coupled to each other using a wired communication line or a wireless communication link.

In one or more embodiments, including the above-discussed configurations, the reconfigurable switch 500 appears as an RFID tag to a controller, and as such, can be controlled using RFID signal protocols. For example, the reconfigurable switch 500 has a unique ID corresponding to the RFID IC 510 (which may be communicated in a header portion of a transmit signal to communicate with the reconfigurable switch 500). Thus, in operation, communication with the reconfigurable switch 500 may be performed in a manner that would be used to communicate with an RFID tag. For example, in some embodiments, a Gen2 RFID communication protocol may be used to communicate with the RFID IC 510 to control switching of the reconfigurable switch 400. The communication in various embodiments includes, for example, an RFID communication setup sequence (including a handshake) to communicate with the switch 506. By sending an RFID signal addressed to the specific RFID IC 510 of the reconfigurable switch 500, the switch 506 associated with that RFID IC 510 may be controlled, such as between different antenna radiation patterns as described herein. The determination of the ID associated with the RFID IC 510 (and RFID ICs in other reconfigurable switches), and thus, with the reconfigurable switch 500, may be stored in a lookup table or other memory (e.g., the memory 120 shown in FIG. 1) to allow for lookup of the ID for the RFID IC 510.

Additionally, the reconfigurable switch 500 includes a coupler 512 (e.g., a resistive ladder with impedance matching, resistive divider or microwave coupler) that couples the input port 502 to the RFID IC 510 and to the switch 506. The coupler 512 may be any coupling member that splits a portion of the incoming RFID signal and communicates the signal to the RFID IC 510. For example, the coupler 512 may take a small portion of the signal (e.g., 20 dB lower in power) and communicate that portion to the RFID IC 510 to control the RFID IC 510, which allows for control of the switch 506 at a lower insertion loss. The other portion of the signal is communicated through the coupler 512 to the antenna element 508. Thus, the RFID signal received by the reconfigurable switch 500 flows through the coupler 512 to the antenna element 508, with a portion of the RFID signal split off from the main RFID signal and sent to the RFID IC 510. The main portion of the RFID signal that passes through the coupler 512 may be transmitted by the antenna element 508 depending on the state of the switch 506.

It should be noted that in various embodiments, the switch 506 and the RFID IC 510 are powered from a DC voltage biased on the coaxial cable independent of the RF signal. However, in other embodiments, the DC voltage is injected into the RF signal that is communicated to the reconfigurable switch 500 (e.g., DC signal injected to RF signal from an RFID reader).

In operation, the reconfigurable switch 500 appears to the system as an RFID tag (with memory fields) and can be controlled using RFID control signals. For example, a unique bit value may be written to a memory field of the RFID IC 510 (by sending a an RFID signal uniquely addressed to the RFID IC 510 using RFID transmission protocols) to control the reconfigurable switch 500 by communicating to the RFID IC 510 a control signal to switch the switch 406. For example, the RFID IC 510 receives an RFID signal that causes the RFID IC 510 to control the reconfigurable switch 500 (by controlling the switch 506) to change states from the current state to the other state (e.g., from State A to State B or State B to State A). Thus, RFID communication (e.g., RFID signals/data, general purpose command signals, etc.) may be provided between the RFID reader 200 and one or more RFID tags using different antenna radiation patterns. As such, the reconfigurable switch 500 is capable of being used in combination with different RFID readers in different applications by selectively addressing the RFID IC 510 in the reconfigurable switch 500 to activate the antenna element 508 coupled with the switch 506 based on the unique ID of the RFID IC 510 for the reconfigurable switch 500. The reconfigurable switch 500 allows communication with one or more RFID tags, such as the RFID tag 132a, 132b within an RFID reading range of the antenna element 508 using RFID communication protocols. Using RFID control signals, the RFID reader 200 is able to communicate with one or more RFID tags using different polarizations by selectively activating the antenna element 508 and without requiring modification to the RFID reader 200 to allow the reconfiguration of the antenna. Thus, in an RFID scanning operation, before reading RFID tags, the reader sends a control signal to the reconfigurable switch 500 to set the state of the switch 506. The reconfigurable switch 500 has two states, thus defining an antenna arrangement with two states, which in the reconfigurable switch 500 defines two different antenna frequency bands (in combination with other antenna elements). It should be noted that additional switches and antenna elements may be added to provide additional states.

Figure 6:
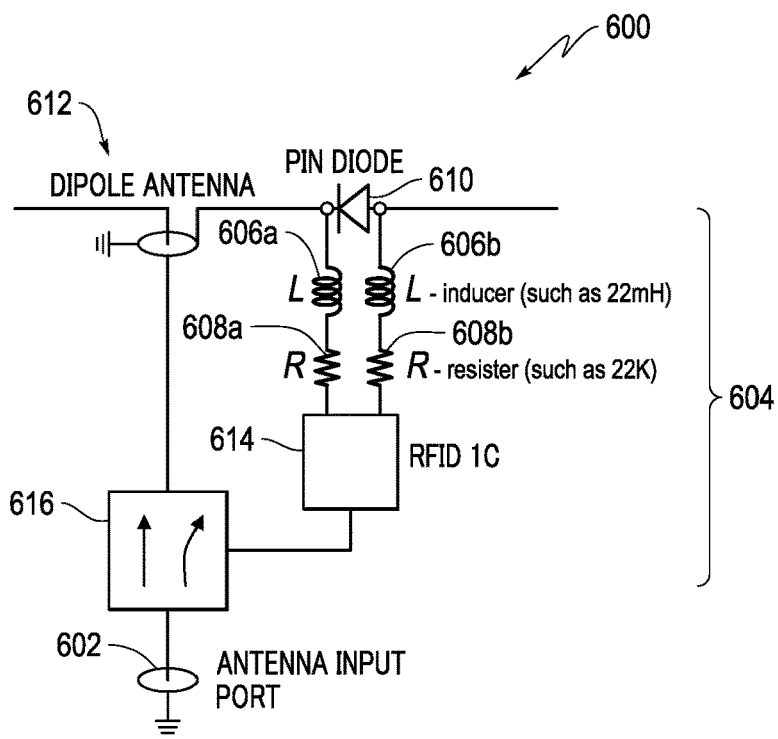
FIG. 6 is a block diagram of a reconfigurable switch according to another embodiment.

In another embodiment, as illustrated in FIG. 6, a reconfigurable antenna 600 includes a control portion 604, which in some embodiments is embodied as a printed circuit board (PCB), that allows for selective control and reconfiguration of the antenna characteristics of the reconfigurable antenna 600. The control portion 604 includes controllable elements (including switching elements) that appear to the RFID system 100 as RFID tags that can be selectively controlled using RFID control signals. In particular, the reconfigurable antenna 600 includes a switching arrangement formed from a pair of inductors 606a and 606b and a pair of resistors 608a and 608b, having a diode 610 (e.g., a PIN diode) connected between the parallel connection arrangement of the pair of inductors 606a and 606b and the pair of resistors 608a and 608b.

The signals transmitted electively to one set of the pair of inductors 606a and 606b and the pair of resistors 608a and 608b is controllable using RFID control signals from an RFID reader. As shown in FIG. 6, an antenna input port 602 may be provided for connection to the reconfigurable antenna 600. For example, the input port 602 allows for connection to the RFID system 100, such as to connection port 232 (shown in FIG. 2C) via a coaxial cable. In operation, by selectively communicating signals to the pair of inductors 606a and 606b and the pair of resistors 608a and 608, a reconfigurable antenna arrangement is provided.

In one embodiment, the pair of inductors 606a and 606b and the pair of resistors 608a and 608b have signals selectively communicated there to provide a switching arrangement to select an antenna element 612. Similar to other embodiments described herein, an RFID type of transmitter/receiver may be used to selectively activate the antenna element 612 to provide a reconfigurable antenna frequency band.

In the embodiment of FIG. 6, the pair of inductors 606a and 606b and the pair of resistors 608a and 608b define an antenna switch configured to be switchable into two switching states to change the operating characteristics of the antenna element 612. For example, with the reconfigurable antenna 600 as shown in FIG. 6, the RFID apparatus 200 (RFID reader) can selectively select the antenna element 612 to define a particular desired or required frequency band based on the operating characteristics of the antenna element 612 (which may be connected to other antenna elements). The RFID reader 200 is then able to communicate with an RFID tag (e.g., the RFID tag 132a or 132b shown in FIG. 1) using RFID signals and obtain RFID data from the RFID tag. The reconfigurable antenna 600 may include additional antenna elements that may be used to operate the RFID apparatus 200 at additional different frequency bands.

In operation, the reconfigurable antenna 600 includes a controller or control module, which in the illustrated embodiment is an integrated circuit (IC), more particularly an RFID IC 614 that has a unique addressable ID (e.g., Gen2 EPC ID). The pair of inductors 606a and 606b and the pair of resistors 608a and 608b receive selective signals controllable by uniquely addressing the RFID IC 614 to thereby control the reconfigurable antenna 600 by sending a control signal. For example, in one embodiment, the RFID IC 614 is an EM4325 Gen2 IC (available from EM Microelectronic) with a Serial Peripheral Interface (SPI) that outputs signals the pair of inductors 606a and 606b and the pair of resistors 608a and 608b (e.g., the pair of inductors 606a and 606b and the pair of resistors 608a and 608b may receive signals controlled by signals from RFID IC GPIO (general-purpose input/output) pins of the EM4325 Gen2 IC). In operation, RFID control signals may be transmitted to the reconfigurable antenna 600 and received by the RFID IC 614, such that the RFID IC 614 operates as an RF front end and protocol handler for communication with one or more RFID tags as described in more detail herein. Thus, this configuration allows for the reconfigurable antenna 600 to be switched between states, such that the antenna element 612 may be selectively controlled, thereby allowing RFID signal transmission via the antenna element 612 to define different frequency bands (e.g., communication with one or RFID tags using RFID communication protocols). The various components of the reconfigurable switch 600 may be coupled via one or more different connection arrangements, including wirelessly or wired.

In one or more embodiments, including the above-discussed configurations, the reconfigurable switch 600 appears as an RFID tag to a controller, and as such, can be controlled using RFID signal protocols. For example, the reconfigurable switch 600 has a unique ID corresponding to the RFID IC 614 (which may be communicated in a header portion of a transmit signal to communicate with the reconfigurable switch 600). Thus, in operation, communication with the reconfigurable switch 600 may be performed in a manner that would be used to communicate with an RFID tag. For example, in some embodiments, a Gen2 RFID communication protocol may be used to communicate with the RFID IC 614 to control switching of the reconfigurable switch 600. The communication in various embodiments includes, for example, an RFID communication setup sequence (including a handshake) to communicate with the reconfigurable switch 600. By sending an RFID signal addressed to the specific RFID IC 614 of the reconfigurable switch 600, the reconfigurable switch 600 associated with that RFID IC 614 may be controlled. The determination of the ID associated with the RFID IC 614 (and RFID ICs in other reconfigurable switches), and thus, with the reconfigurable switch 600, may be stored in a lookup table or other memory (e.g., the memory 120 shown in FIG. 1) to allow for lookup of the ID for the RFID IC 614.

Additionally, the reconfigurable switch 600 includes a coupler 616 (e.g., a resistive ladder with impedance matching, resistive divider or microwave coupler) that couples the input port 602 to the RFID IC 614 and to the antenna element 612. The coupler 616 may be any coupling member that splits a portion of the incoming RFID signal and communicates the signal to the RFID IC 614. For example, the coupler 616 may take a small portion of the signal (e.g., 20 dB lower in power) and communicate that portion to the RFID IC 614 to control the RFID IC 614, which allows for control at a lower insertion loss. The other portion of the signal is communicated through the coupler 616 to the antenna element 612. Thus, the RFID signal received by the reconfigurable switch 600 flows through the coupler 616 to the antenna element 612, with a portion of the RFID signal split off from the main RFID signal and sent to the RFID IC 614. The main portion of the RFID signal that passes through the coupler 616 may be transmitted by the antenna element 612 depending on the state of the reconfigurable switch 600.

It should be noted that in various embodiments, the RFID IC 614 is powered from a DC voltage biased on the coaxial cable independent of the RF signal. However, in other embodiments, the DC voltage is injected into the RF signal that is communicated to the reconfigurable switch 600 (e.g., DC signal injected to RF signal from an RFID reader).

In operation, the reconfigurable switch 600 appears to the system as an RFID tag (with memory fields) and can be controlled using RFID control signals. For example, a unique bit value may be written to a memory field of the RFID IC 614 (by sending an RFID signal uniquely addressed to the RFID IC 614 using RFID transmission protocols) to control the reconfigurable switch 600 by communicating to the RFID IC 614 a control signal. For example, the RFID IC 614 receives an RFID signal that causes the RFID IC 614 to control the reconfigurable switch 600 to change states from the current state to the other state (e.g., from State A to State B or State B to State A) by communicating signals to the pair of inductors 606a and 606b and the pair of resistors 608a and 608b. Thus, RFID communication (e.g., RFID signals/data, general purpose command signals, etc.) may be provided between the RFID reader 200 and one or more RFID tags using different antenna radiation patterns. As such, the reconfigurable switch 600 is capable of being used in combination with different RFID readers in different applications by selectively addressing the RFID IC 614 in the reconfigurable switch 600 to activate the antenna element 612 based on the unique ID of the RFID IC 614 for the reconfigurable switch 600. The reconfigurable switch 600 allows communication with one or more RFID tags, such as the RFID tag 132a, 132b within an RFID reading range of the antenna element 612 using RFID communication protocols. Using RFID control signals, the RFID reader 200 is able to communicate with one or more RFID tags using different polarizations by selectively activating the antenna element 612 and without requiring modification to the RFID reader 200 to allow the reconfiguration of the antenna. Thus, in an RFID scanning operation, before reading RFID tags, the reader sends a control signal to the reconfigurable switch 600 to set the state thereof. The reconfigurable switch 600 has two states, thus defining an antenna arrangement with two states, which in the reconfigurable switch 600 defines two different antenna frequency bands (in combination with other antenna elements). It should be noted that additional switches and antenna elements may be added to provide additional states.

The embodiments of the reconfigurable antenna 500 and 600 may include an antenna that is linearly polarized, which may have a separate receive port and backscatter port. The RFID IC in these embodiments is connected to the receive port, and a switch (as described herein) is connected to backscatter port. Thus, in operation, and as described herein, the RFID IC controls the switching operation to add or subtract a portion of an antenna element. It should be noted that in the embodiments of FIGS. 5 and 6, the RFID ICs 510 and 614 and the switching elements share the same antenna and have a common electrical ground. It should be noted that many more frequency reconfigurable antennas (such as slot antennas) could be used to achieve a similar effect.

Figure 7:
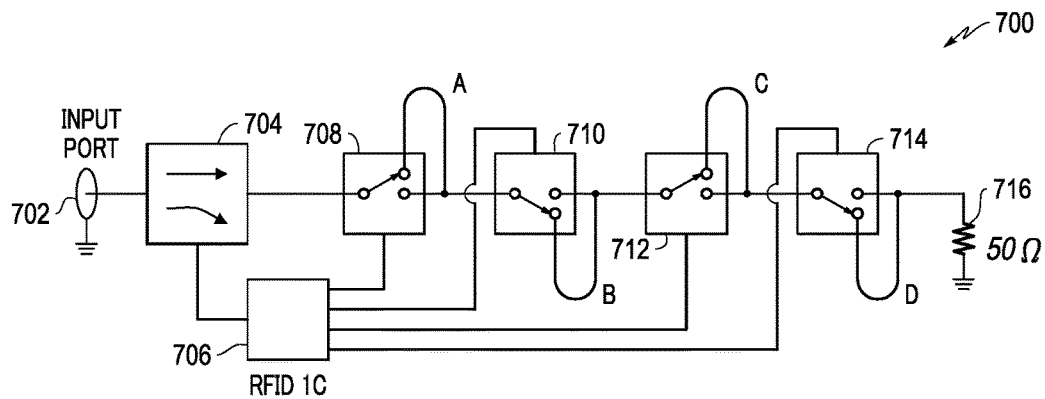
FIG. 7 is a block diagram of a reconfigurable switch according to another embodiment.
Figure 8:
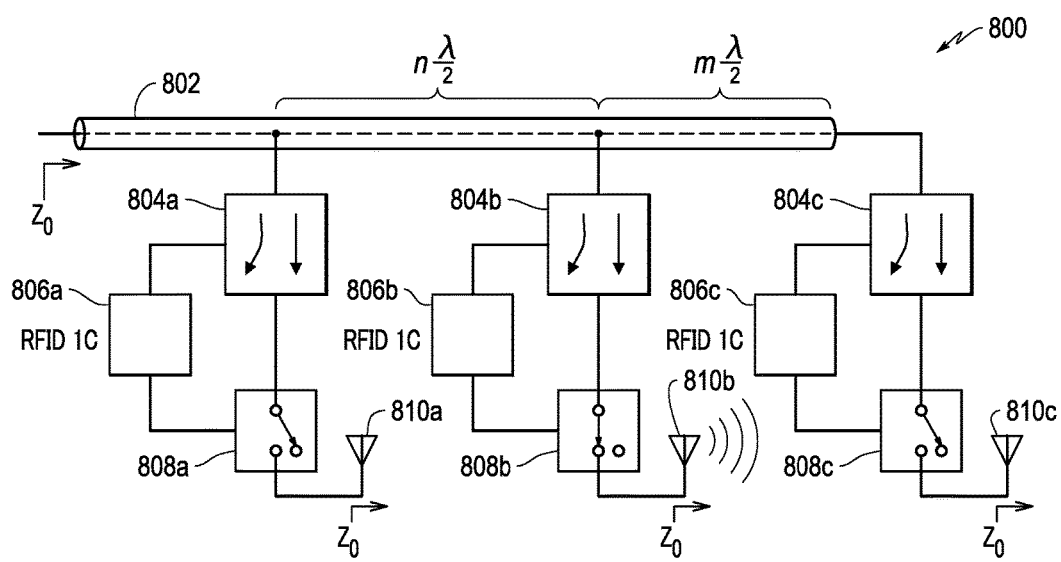
FIG. 8 is a block diagram of a reconfigurable switch according to another embodiment.

Previous descriptions herein of RFID enabled switches embedded into the antenna structure have a mechanism to control a far-field radiation pattern, impedance characteristics, or polarization characteristics. Additionally, RFID switches embedded into physically large antennas can control near-field characteristics. FIGS. 7 and 8 show an antenna 700, 800 that is physically large compared to the wavelength, $\lambda$, of operation. The antenna is constructed from three radiating elements 810 (illustrated as elements 810a-810c), and the elements 810 are separated by a transmission line 802 with lengths equal to multiples of a half wavelength, $\lambda/2$, where the multiples are represented by arbitrary positive integers, n and m. In FIG. 8, couplers 804 (illustrated as couplers 804a-804c) directly attach to the transmission line 802, and the majority of the power from the couplers 804 feed into switches 808. Part of the power from the coupler 804 feeds into an RFID IC 806 (illustrated as RFID ICs 806a-806c) that, via RF commands from the RFID reader, is able to control the switch position. The positions of the switches 808 in FIG. 8 are shown as open state for the left switch, connected to radiating element for the center switch, and open for the right switch. In these switch positions, the input impedance of the one large antenna appears as a matched load, Zo, to the reader, and the power radiates from the center element 810b. Other switch positions can be controlled by RF commands to the RFID ICs 806 to radiate power from the other elements 810a and 810c. For radiating from the right element 810c, the switch positions would be open for the left and center switches 806a and 806b, while the right switch 806c would connect through to the right element 810c. For radiating from the left element 810a, the switch positions would be open for the center and right switches 808b and 808c, while the left switch 808a would connect through to the left element 810a. Other combinations of switch positions are possible, but FIGS. 7 and 8, these other combinations would not be a matched load.

It should be noted that in FIG. 7, a single RFID IC 706 is connected to plural switches 708-712 to define a serial arrangement from an input port 702 and a coupler 704 to a resistive element 716. In FIG. 7, a meandered long matched terminated transmission line is defined where the current path is switched into any of the meandered sections (four in this embodiment defined by the switches 708-714). Depending on the current path (defined by states of four switches 708-714) the near field pattern of this antenna changes. This results in an altered reflectance of the antenna during transmission to reader.

Figure 9:
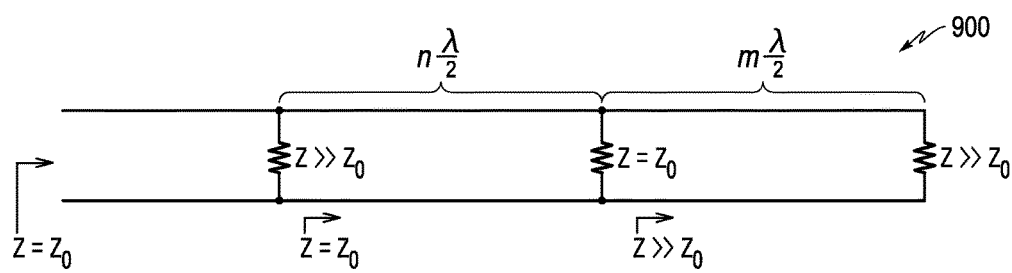
FIG. 9 is an impedance diagram for the reconfigurable switch of FIG. 8.

FIG. 9 shows an equivalent transmission line diagram for the switch positions of FIGS. 7 and 8 that assists in determining the load of the antenna. The open position of the left and right switches 808a and 808c make the lumped impedances large, Z>>Zo, and the center position attaching to the radiating element 810b make the lumped impedance matched, Z=Zo. When combining the center and right side of the transmission line 802, the equivalent impedance appear as a Zo. And when combining all lumped impedances distributed over the transmission line 802, the total equivalent impedance appears as matched at Z=Zo to the RFID reader.

Other configurations for physically large antennas with RFID enabled switches are possible with different lengths of transmission lines and with different states RF switches. For example, the switch could have three states of open, short, and connected to radiating element. Also, the transmission lines could be arbitrary length and not limited to multiples of a half wavelength.

It should be noted that the reconfigurable switches described herein may be used in different applications with a base station communicating with the reconfigurable switches using appropriate commands or signals for the particular operating environment. For example, as described in more detail herein, the reconfigurable switches may be used in different RFID applications or in non-RFID applications.

In order to communicate with one or more RFID tags, such as before reading one or more RFID tags, the RFID reader 200 in various embodiments sends a control signal, setting the state of the reconfigurable switches coupled to the RFID reader 202. For example, the control signal is sent through the coaxial cable and passes through the coupler of the reconfigurable switch as described herein. In the reconfigurable switch, a portion of the control signal is split and sent to the RFID IC. The RFID IC having the unique ID addressed within the control signal (as described herein) is thereby controlled, which result in the switch being switched between states in various embodiments to define different polarizations, antenna radiation patterns or frequency bands. Thus, because the RFID IC appear to the RFID reader 200 as an RFID tag, an RFID protocol read signal can be used to control the RFID IC. For example, the RFID signal received by the RFID IC commands the RFID IC to switch the state of one or more switches as described herein. It should be noted that when power is switched off (either DC bias on coaxial cable 206 or RF carrier), the reconfigurable switch may be reset (e.g., to state A) in some embodiments.

Figure 10:
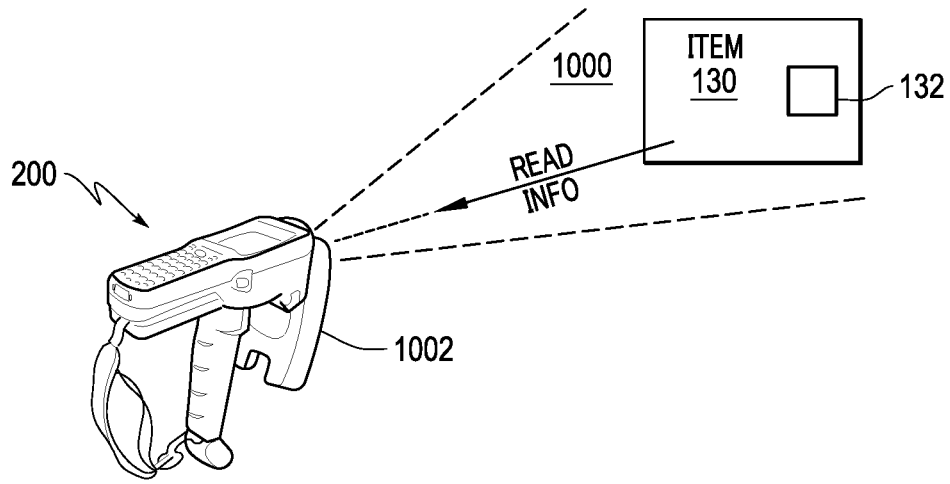
FIG. 10 depicts a scanning operation according to one embodiment.

In various embodiments, the RFID apparatus 200 is moved in one or more directions to scan the region of interest 134 (shown in FIG. 1) to perform a read scan for RFID tags 132. For example, as illustrated in FIG. 10, a field of view 1000 of the RFID apparatus 200 is scanned within the region of interest 134 to locate a particular item 130 using a reconfigurable antenna polarization or radiation pattern as described herein. In the illustrated embodiment of FIG. 10, an antenna module 1002 is coupled to the RFID apparatus 200. The antenna module may be embodied as or include one or more the reconfigurable switches described herein, such that a reconfigurable antenna arrangement may be provided using a single coaxial cable connection and simplified control via RFID control protocols.

Various embodiments also are not limited to UHF (900 MHz) RFID and can be used for reconfigurable antenna systems for other wireless technologies (e.g., WiFi, wireless WAN, Bluetooth, etc.) that operate in various other frequency bands (e.g., 2.4 GHz, 5.8 GHz, etc.) and may be implemented in accordance with the present disclosure.

The reconfigurable switches can also be integrated into, for example, RFID antennas, and such RFID antennas can have properties (e.g., radiation pattern, polarization, frequency band) configured over the main RF input using the RFID signals from the primary RFID reader to which the antennas are connected. For example, the reconfigurable switch 400 may be used to switch between phase shifters (by selecting different outputs of the switch) using RFID control commands to generate different antenna radiation patterns or polarizations (e.g., 0° to 90° or 90° to 0°. Thus, dynamically steerable beams, controlled by RFID signals, may be provided. In other embodiments, dynamically switchable polarizations, controlled by RFID signals, may be provided.

Additionally, the ICs or circuits controlling the inside the reconfigurable switches do not have to adhere to passive backscatter RFID protocol and can use other protocol and frequencies. For example, communication with the reconfigurable switches can be one-directional (e.g., using a one-directional communication protocol). For example, the radio or RFID reader can send signals to configure the reconfigurable switches without requiring an acknowledgement, such that the standard RFID handshake protocol would not be needed. In this way, the reconfigurable switches can be simpler (and only need to be able to receive).

The reconfigurable switches can also be powered via DC bias voltage on the RF coaxial from different sources, such that in some embodiments, a DC bias signal is not used. For example, the reconfigurable switches can be powered from battery, from connection to an external power grid, or from a dedicated power harvester (e.g., harvesting RF power from the coaxial cable, harvesting solar power, etc.).

In various embodiments, the reconfigurable switches do not differentiate among the various ports, for example, the three ports of the switching elements (e.g., characteristics/types of the ports). For example, any of the three ports can be used to connect to the different antenna elements. Thus, specialized types of ports are not needed. Thus, as should be appreciated, various embodiments provide a generic nature of the ports that enables different network topologies. Additionally, in various embodiments, all three ports transport both DC and RF signals. Thus, separate ports for each are not needed.

It should be appreciated that the switch control logic of various embodiments is always connected to the input port, and thus, is always discoverable. It also should be noted that the functionality of various embodiments may be extended beyond port switching, and may include communication to a microcontroller over RFID, general purpose input/output (GPIO) capabilities (control LEDs, read sensors), etc.

Thus, various embodiments provide a reconfigurable antenna that can be easily reconfigured with RFID control signals used to communicate with RFID tags. It should be noted that while the various embodiments are described in connection with particular operating characteristics, the various embodiments are not limited to the specific operating environment. Thus, one or more embodiments may be used in connection with different devices or in different applications.

Figure 11:
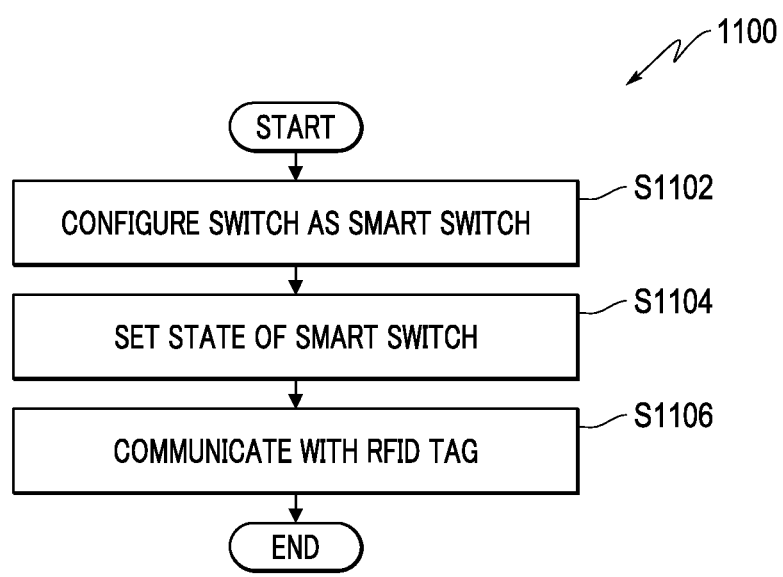
FIG. 11 is a flowchart of a method according to one or more embodiments.

A method 1100 for providing a reconfigurable RFID antenna system is illustrated in FIG. 11. It should be appreciated that the method 1100 may be implemented by one or more the embodiments disclosed herein, which may be combined or modified as desired or needed. Additionally, the steps in the method 1100 may be modified, changed in order, performed differently, performed sequentially, concurrently or simultaneously, or otherwise modified as desired or needed.

The method 1100 includes configuring switches as RFID smart switches at 1102. For example, as described herein, one or more RFID smart switches (e.g., the reconfigurable switches as described herein) may be configured for reconfigurable polarization or radiation patterns and appear to a control system as RFID tags. Thus, the RFID smart switches may be controlled using RFID signals that are typically used to control RFID tags, which instead switch the RFID smart switches between different states to allow a controller (e.g., RFID reader) to be coupled with an antenna to dynamically switch the antenna polarization or radiation pattern. Thus, by switching the states of the reconfigurable switches using RFID protocol signals and/or commands, selective polarization or radiation patterns may be defined.

Once the RFID smart switch coupled with an RFID reader is set to a desired state at 1104 (e.g., transmitting an RFID control signal), the controller can communicate with an RFID tag via the antenna connected to the smart switch at 1106. For example, the controller may send a control, read, interrogation, or other command signal or RFID signal via the antenna to communicate with an RFID tag. In response, the RFID tag may provide RFID data or other information.

The method 1100 may be implemented or performed using one or more systems described herein, such as the smart switches. The steps also may be performed by a controller, such that the controller operates an RFID type reader or operates as a specialized processing machine/specialized hardware.

Thus, various embodiments provide antennas with reconfigurable antenna characteristics (e.g., polarization or radiation pattern) using a simplified control scheme that uses a single coaxial cable connection and RFID protocol command signals to select a desired or required antenna characteristic.

It should be noted that one or more embodiments can comprise one or more microprocessors (which may be embodied as a processor) and a memory, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, one or more configurations described herein can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can communicate between components using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described herein with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks and when implemented in one or more embodiments, results in a transforming or converting a general purpose computer/processor/hardware to a specialized computer/processor/hardware that improves the technological art.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A device comprising:
   a plurality of antenna elements configured to read a radio-frequency identification (RFID) tag;
   a switch having an input configured to receive an RFID control signal from an RFID reader via a communication line to select one antenna of the plurality of antenna elements; and a controller configured to control a state of the switch, wherein the switch is configured to be switched between states when the controller receives the RFID control signal comprising an address unique to the controller, thereby allowing the RFID reader to send an interrogation signal to and receive a response from the RFID tag in response to receiving the RFID control signal.

2. The device of claim 1, wherein the switch is configured to be switched between antenna states to change an antenna characteristic for communicating with the RFID tag.

3. The device of claim 2, wherein the antenna characteristic is one of a polarization or a resonant frequency band or a far-field radiation pattern or a near-field radiation pattern.

4. The device of claim 1, further comprising a coupler and wherein the switch is a radio-frequency (RF) switch and the controller is an RFID integrated-circuit (IC), an input of the device is connected to the RF switch through the coupler, and the RFID IC is connected between the coupler and the RF switch.

5. The device of claim 1, wherein the communication line is a single coaxial cable coupled with the RFID reader and communicates control and RFID interrogation signals to the switch.

6. The device of claim 1, further comprising a coupler that is one of a resistive ladder, a resistive divider or a microwave coupler.

7. The device of claim 1, further comprising a hybrid coupler connected between the switch and the plurality of antenna elements, the hybrid coupler controllable to change an antenna radiation pattern.

8. The device of claim 1, wherein the switch is configured to appear as an RFID tag to the RFID reader.

9. The device of claim 1, wherein the communication line is a single coaxial cable and wherein the switch is powered by RF power harvesting from the control signal.

10. A system comprising:
an RFID reader; and
a reconfigurable antenna configured to couple to the RFID reader, the reconfigurable antenna having an antenna characteristic that is changed based on an RFID control signal received from the RFID reader, the reconfigurable antenna configured to appear as an RFID tag to the RFID reader, wherein the RFID control signal comprises an address unique to a controller in the reconfigurable antenna, wherein the controller is configured to change antenna characteristic of the reconfigurable antenna.

11. The system of claim 10, wherein the reconfigurable antenna is configured to couple to the RFID reader with a single coaxial cable.

12. The system of claim 10, wherein the reconfigurable antenna comprises a coupler, a radio-frequency (RF) switch and a radio-frequency identification (RFID) integrated-circuit (IC), and the reconfigurable antenna is configured to be switched using the RFID control signal between states by switching the RF switch when the RFID IC is uniquely addressed by the RFID control signal.

13. The system of claim 12, wherein the states correspond to a change in the antenna characteristic, the antenna characteristic being one of a polarization or a radiation pattern.

14. The device of claim 10, wherein the communication line is a single coaxial cable and wherein the switch is powered by RF power harvesting from the control signal.

15. The system of claim 10, further comprising a hybrid coupler controlling an antenna radiation pattern.

16. The system of claim 10, further comprising a controller formed on a printed circuit board, the controller configured to change the antenna characteristic of the reconfigurable antenna.

17. The system of claim 10, wherein the reconfigurable antenna is a module configured for removable coupling to the RFID reader.

18. The system of claim 10, wherein the reconfigurable antenna is uniquely addressable using the RFID control signal with a unique address in a header of the control signal.

19. A method for controlling an antenna, the method comprising:
sending an RFID control signal from an RFID reader to a reconfigurable antenna via a communication line, the RFID control signal comprising an address of a controller in the reconfigurable antenna;
switching a state of the reconfigurable antenna to change an antenna characteristic of the reconfigurable antenna in response to determining that the address in the control signal matches an address stored in memory of the controller of the reconfigurable antenna; and
sending an interrogation signal to an RFID tag via the antenna of the reconfigurable antenna and receiving a response from the reconfigurable antenna after the switching is performed.

20. The method of claim 19, wherein the RFID reader sends the interrogation signal over the communication line to the reconfigurable antenna, the communication line being a single coaxial cable.

* * * * *